(12) United States Patent
Palmer

(10) Patent No.: US 11,760,502 B2
(45) Date of Patent: Sep. 19, 2023

(54) FUEL DELIVERY SYSTEM WITH PURGE GAS STEP AND FUEL GAS FLUSHING STEP AND METHOD THEREOF

(71) Applicant: ROLLS-ROYCE plc, London (GB)

(72) Inventor: Chloe J. Palmer, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/823,732

(22) Filed: Aug. 31, 2022

(65) Prior Publication Data

US 2023/0092811 A1    Mar. 23, 2023

(30) Foreign Application Priority Data

Sep. 17, 2021    (GB) ...................................... 2113279

(51) Int. Cl.
| | |
|---|---|
| *B64D 37/32* | (2006.01) |
| *F02C 7/232* | (2006.01) |
| *F02C 9/28* | (2006.01) |
| *F02C 3/22* | (2006.01) |
| *F02C 7/22* | (2006.01) |
| *F02C 9/40* | (2006.01) |
| *F02C 7/224* | (2006.01) |

(52) U.S. Cl.
CPC ............... *B64D 37/32* (2013.01); *F02C 3/22* (2013.01); *F02C 7/222* (2013.01); *F02C 7/224* (2013.01); *F02C 7/232* (2013.01); *F02C 9/28* (2013.01); *F02C 9/40* (2013.01); *F05D 2220/323* (2013.01); *F05D 2240/36* (2013.01); *F05D 2260/60* (2013.01); *F05D 2270/301* (2013.01)

(58) Field of Classification Search
CPC ......... B64D 37/00; B64D 37/30; F01C 21/00; F23K 5/18
See application file for complete search history.

(56) References Cited

U.S. PATENT DOCUMENTS

| | | | | |
|---|---|---|---|---|
| 2,980,173 | A * | 4/1961 | Perkey | F02C 7/26 251/48 |
| 3,502,027 | A * | 3/1970 | Avery | F02C 7/232 137/115.03 |
| 3,696,612 | A * | 10/1972 | Berman | F02C 7/275 60/786 |
| 4,019,315 | A * | 4/1977 | Yannone | F02C 7/26 60/773 |
| 6,996,969 | B2 * | 2/2006 | Dalton | F02C 9/32 60/734 |

(Continued)

OTHER PUBLICATIONS

Great Britain search report dated Jun. 20, 2022, issued in GB Patent Application No. 2113279.0.

(Continued)

*Primary Examiner* — Alain Chau

(57) ABSTRACT

A fuel delivery system for a gas turbine engine comprises a cryogenic fuel tank, a first fuel line for connection to the cryogenic fuel tank, a fuel pump connected to receive fuel via the first fuel line, a plurality of fuel lines connecting the fuel pump to a combustor of the gas turbine engine, a controller configured to operate the fuel delivery system, a purge gas tank connected to the first fuel line and configured to store a purge gas for purging the plurality of fuel lines and a fuel gas tank connected to the first fuel line and configured to store a fuel gas for flushing purge gas from the plurality of fuel lines.

20 Claims, 12 Drawing Sheets

(56) References Cited

U.S. PATENT DOCUMENTS

| | | | |
|---|---|---|---|
| 10,247,110 B2* | 4/2019 | Scipio | F01D 25/32 |
| 10,584,643 B2* | 3/2020 | Schell | F02C 9/26 |
| 2002/0088504 A1* | 7/2002 | Sauer | A62C 3/06 |
| | | | 141/98 |
| 2007/0101723 A1* | 5/2007 | Kunkle | F02C 7/232 |
| | | | 60/39.463 |
| 2009/0272118 A1* | 11/2009 | Alexander | F02C 9/40 |
| | | | 60/39.463 |
| 2010/0031658 A1* | 2/2010 | Falke | F02C 9/36 |
| | | | 60/734 |
| 2013/0186057 A1* | 7/2013 | Shanmugam | F23R 3/36 |
| | | | 60/776 |
| 2015/0344144 A1 | 12/2015 | Kamath et al. | |
| 2015/0344145 A1 | 12/2015 | Epstein et al. | |
| 2016/0076461 A1* | 3/2016 | Kawai | B64D 37/30 |
| | | | 60/39.463 |
| 2017/0082034 A1* | 3/2017 | Scipio | F02C 7/22 |
| 2017/0254270 A1* | 9/2017 | Okada | F23R 3/36 |
| 2018/0187609 A1* | 7/2018 | Schell | F02C 7/232 |
| 2020/0080480 A1* | 3/2020 | Horikawa | F02C 7/228 |
| 2020/0088098 A1* | 3/2020 | Roberge | F02C 7/16 |
| 2022/0145801 A1* | 5/2022 | McCurdy Gibson | F02C 3/22 |
| 2022/0195929 A1* | 6/2022 | Aguilar | F02C 3/30 |

OTHER PUBLICATIONS

European Search report dated Jan. 30, 2023, issued in EP Patent Application No. 22191842.

\* cited by examiner

FUEL DELIVERY SYSTEM WITH PURGE GAS STEP AND FUEL GAS FLUSHING STEP AND METHOD THEREOF

CROSS-REFERENCE TO RELATED APPLICATIONS

This specification is based upon and claims the benefit of priority from United Kingdom patent application number GB 2113279.0 filed on Sep. 17, 2021, the entire contents of which is incorporated herein by reference.

BACKGROUND

Technical Field

This disclosure relates to fuel delivery for gas turbine engines.

Description of the Related Art

Hydrogen is becoming increasingly attractive as a fuel for combustion engines, particularly gas turbines. Gaseous hydrogen derived from fossil fuels is already successfully used in electricity production, for example. However, the use of hydrogen as a fuel in aero gas turbines is particularly challenging. In particular, the fuel system must guarantee safe operation in all circumstances, particularly when starting and stopping the engine.

SUMMARY

The present application is directed to fuel delivery systems for a gas turbine engine, gas turbine engines including such a fuel delivery system, and associated methods.

In an aspect, one such fuel delivery system comprises:
a first fuel line for connection to a cryogenic fuel tank;
a fuel pump connected to receive fuel via the first fuel line;
a plurality of fuel lines connecting the fuel pump to a combustor of the gas turbine engine;
a controller configured to operate the fuel delivery system;
a purge gas tank connected to the first fuel line and configured to store a purge gas for purging the plurality of fuel lines; and
a fuel gas tank connected to the first fuel line and configured to store a fuel gas for flushing purge gas from the plurality of fuel lines.

In an embodiment, the fuel gas is hydrogen and the purge gas is an inert gas.

In an embodiment, the fuel delivery system further comprises:
a purge gas valve between the purge gas tank and the first fuel line; and
a fuel gas valve between the fuel gas tank and the first fuel line;
wherein the controller is configured to open the purge gas valve to purge gas from the plurality of fuel lines in a first gas purging procedure, and following the first purging procedure, open the fuel gas valve to flush purge gas from the plurality of fuel lines with fuel gas in a second gas purging procedure.

In an embodiment, the fuel delivery system further comprises:
an oxygen sensor at an end of the plurality of fuel lines proximate the combustor,
wherein the controller is configured to operate the fuel delivery system to perform the first gas purging procedure by:
opening valves in the plurality of fuel lines;
opening a vent valve at the end of the plurality of fuel lines;
opening the valve connecting the purge gas tank to the first fuel line to allow purge gas from the purge gas tank to enter the first fuel line;
determining a level of oxygen at the end of the plurality of fuel lines from the oxygen sensor; and
once the level of oxygen falls below a predetermined level, closing the vent valve and the valve connecting the purge gas tank to the first fuel line.

In an embodiment, the controller is further configured to open and then close a plurality of vent valves connected along the plurality of fuel lines after closing the first purge gas tank valve.

In an embodiment, the fuel delivery system further comprises:
a fuel gas sensor at the end of the plurality of fuel lines proximate the combustor,
wherein the controller is configured to operate the fuel delivery system to perform the second gas purging procedure by:
opening valves in the plurality of fuel lines;
opening a vent valve at an end of the plurality of fuel lines proximate the combustor;
opening the valve connecting the fuel gas tank to the first fuel line to allow fuel gas from the fuel gas tank to enter the first fuel line;
determining a level of fuel gas at the end of the plurality of fuel lines from the fuel gas sensor; and
once the level of fuel gas rises above a predetermined level, closing the vent valve and the valve connecting the fuel gas tank to the first fuel line.

In an embodiment, the controller is further configured to open and then close a plurality of vent valves connected to the plurality of fuel lines after closing the valve connecting the fuel gas tank to the first fuel line.

In an embodiment, the plurality of fuel lines comprises second, third, fourth, fifth and sixth fuel lines, the system comprising:
a recuperator connected to a turbine of the gas turbine engine and connected to receive fuel from the liquid fuel pump via series connected second and third fuel lines;
a vaporiser connected to receive fuel from the liquid fuel pump via series connected second and fourth fuel lines;
a buffer tank having an inlet connected to receive fuel from the recuperator and vaporiser via a fifth fuel line; and
a sixth fuel line connecting an outlet of the buffer tank to the combustor of the gas turbine engine.

In an embodiment, the fuel delivery system further comprises:
a pressure sensor configured to measure a pressure in the buffer tank, wherein the controller is further configured to operate the fuel delivery system to perform an engine start-up procedure by:
cranking the engine;
closing a valve in the third fuel line leading to the recuperator;
opening a valve in the fourth fuel line leading to the vaporiser;
opening valves in the first, fifth and sixth fuel lines;
opening a valve in the first fuel line to allow liquid fuel from the cryogenic fuel tank to flow through the first fuel line to the liquid fuel pump;

operating the liquid fuel pump;

monitoring a pressure in the buffer tank sensed by the pressure sensor;

once the pressure in the buffer tank reaches a threshold value, opening a fuel cut-off valve connecting the sixth fuel line to provide fuel to the combustor; and igniting the fuel in the combustor.

In an embodiment, the controller is further configured to operate the fuel delivery system by:

ceasing cranking of the engine;

monitoring a temperature of the recuperator; and opening the valve in the third fuel line leading to the recuperator once the monitored temperature reaches a threshold value.

In an embodiment, the fuel delivery system further comprises:

a first pressure sensor configured to measure a pressure in the buffer tank; and a second pressure sensor configured to measure a pressure in the first fuel line, wherein the controller is further configured to operate the fuel delivery system to perform an engine shutdown procedure by:

closing a liquid fuel valve between the cryogenic fuel tank and the liquid fuel pump;

closing a fuel cut-off valve between the sixth fuel line and the combustor;

shutting down the liquid fuel pump;

modulating a pressure relief valve connected to the buffer tank to maintain a pressure in the buffer tank; and when a pressure in the first fuel line measured by the second pressure sensor reaches a pressure in the buffer tank measured by the first pressure sensor, turning off the vaporiser.

In an embodiment, the controller is further configured to close a valve in the fifth fuel line and open vent valves in third and fourth fuel lines.

In an embodiment, the controller is further configured to open the pressure relief valve connected to the buffer tank until a pressure measured in the buffer tank reaches a threshold.

In an embodiment, the fuel delivery system comprises an inert gas generator configured to provide a purge gas to the purge gas tank.

In another aspect, there is provided a gas turbine engine comprising a fuel delivery system of the aforesaid type.

In another aspect, there is provided a method of operating a gas turbine engine fuel delivery system, comprising:

purging gas from a plurality of fuel lines connecting a fuel pump to a combustor of the gas turbine engine with a purge gas in a first gas purging procedure;

following the first purging procedure, flushing purge gas from the plurality of fuel lines with a fuel gas in a second gas purging procedure.

In an embodiment, the fuel gas is hydrogen and the purge gas is an inert gas.

In an embodiment, the first gas purging procedure comprises:

opening valves in the plurality of fuel lines;

opening a vent valve at the end of the plurality of fuel lines;

opening a valve connecting the purge gas tank to the first fuel line to allow purge gas from the purge gas tank to enter the first fuel line;

determining a level of oxygen at the end of the plurality of fuel lines; and once the level of oxygen falls below a predetermined level, closing the vent valve and the valve connecting the purge gas tank to the first fuel line.

In an embodiment, the second gas purging procedure comprises:

opening valves in the plurality of fuel lines;

opening a vent valve at an end of the plurality of fuel lines proximate the combustor;

opening a valve connecting the fuel gas tank to the first fuel line to allow fuel gas from the fuel gas tank to enter the first fuel line;

determining a level of fuel gas at the end of the plurality of fuel lines from the fuel gas sensor; and once the level of fuel gas rises above a predetermined level, closing the vent valve and the valve connecting the fuel gas tank to the first fuel line.

In an embodiment, the method further comprises performing an engine start-up procedure by:

cranking the engine;

pumping fuel;

opening a fuel cut-off valve provide fuel to the combustor once fuel pressure reaches a threshold value; and igniting the fuel in the combustor.

In an embodiment, the method further comprises performing an engine shutdown procedure by:

cutting off fuel supply to the fuel pump;

closing a fuel cut-off valve to prevent fuel from reaching the combustor;

stopping the fuel pump;

maintaining fuel pressure in the plurality of fuel lines by modulating a pressure relief valve.

DESCRIPTION OF THE DRAWINGS

Embodiments will now be described by way of example only with reference to the accompanying drawings, which are purely schematic and not to scale, and in which.

DETAILED DESCRIPTION

The embodiments disclosed herein are described in the context of a hydrogen-fuelled aero gas turbine, but it should be appreciated that the principles disclosed herein may be applied in other applications, for example ground-based gas turbines for energy production or in marine applications.

FIG. 1

Figure 1:
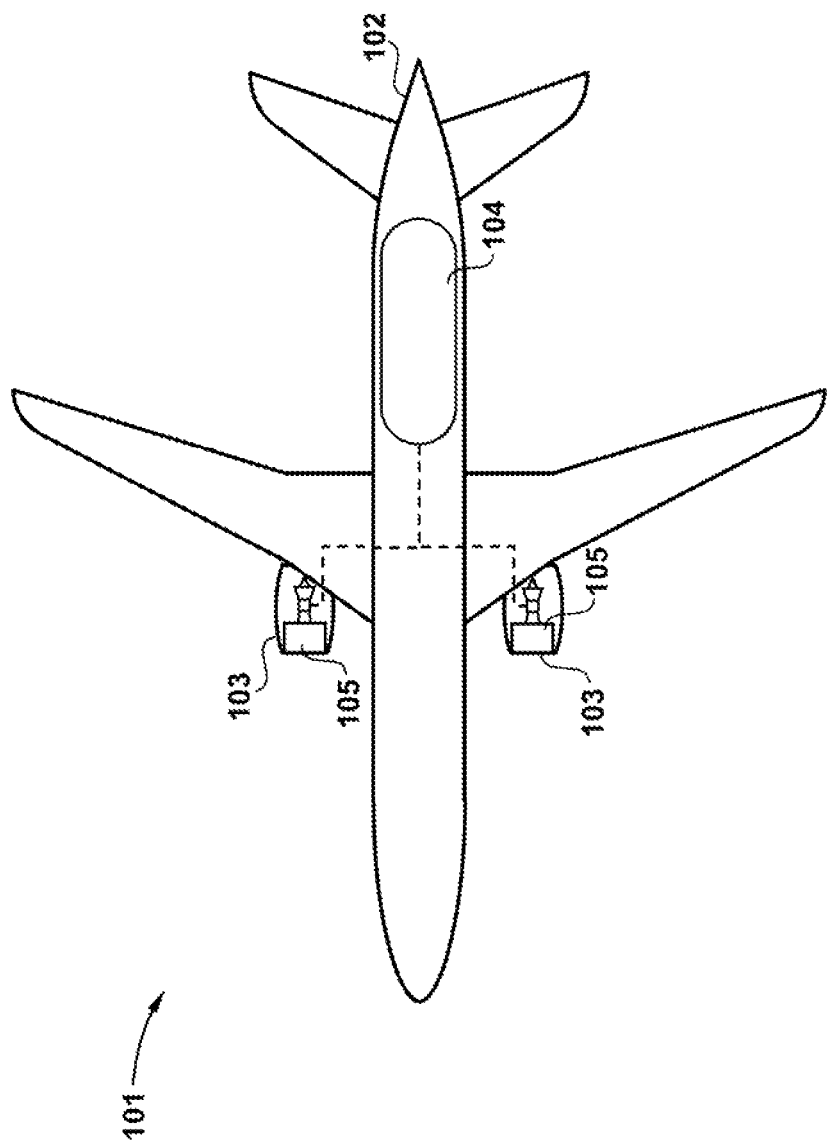
FIG. 1 shows an example hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103. The turbofan engines 103 may, for example, be geared turbofan engines.

A fuel tank 104 is located in the fuselage 102 for storing hydrogen fuel. A fuel delivery system connects the tank 104 with core gas turbines 105 in the turbofan engines 103. The fuel delivery system will be described further with reference to FIGS. 2 and 3. In the present embodiment, the fuel tank 104 is a cryogenic fuel tank that stores the hydrogen fuel in a liquid state. In a specific example, the hydrogen fuel is stored at 20 kelvin. The hydrogen fuel may be pressurised to a pressure of from around 1 bar to around 3 bar, for example around 2 bar.

FIG. 2

Figure 2:
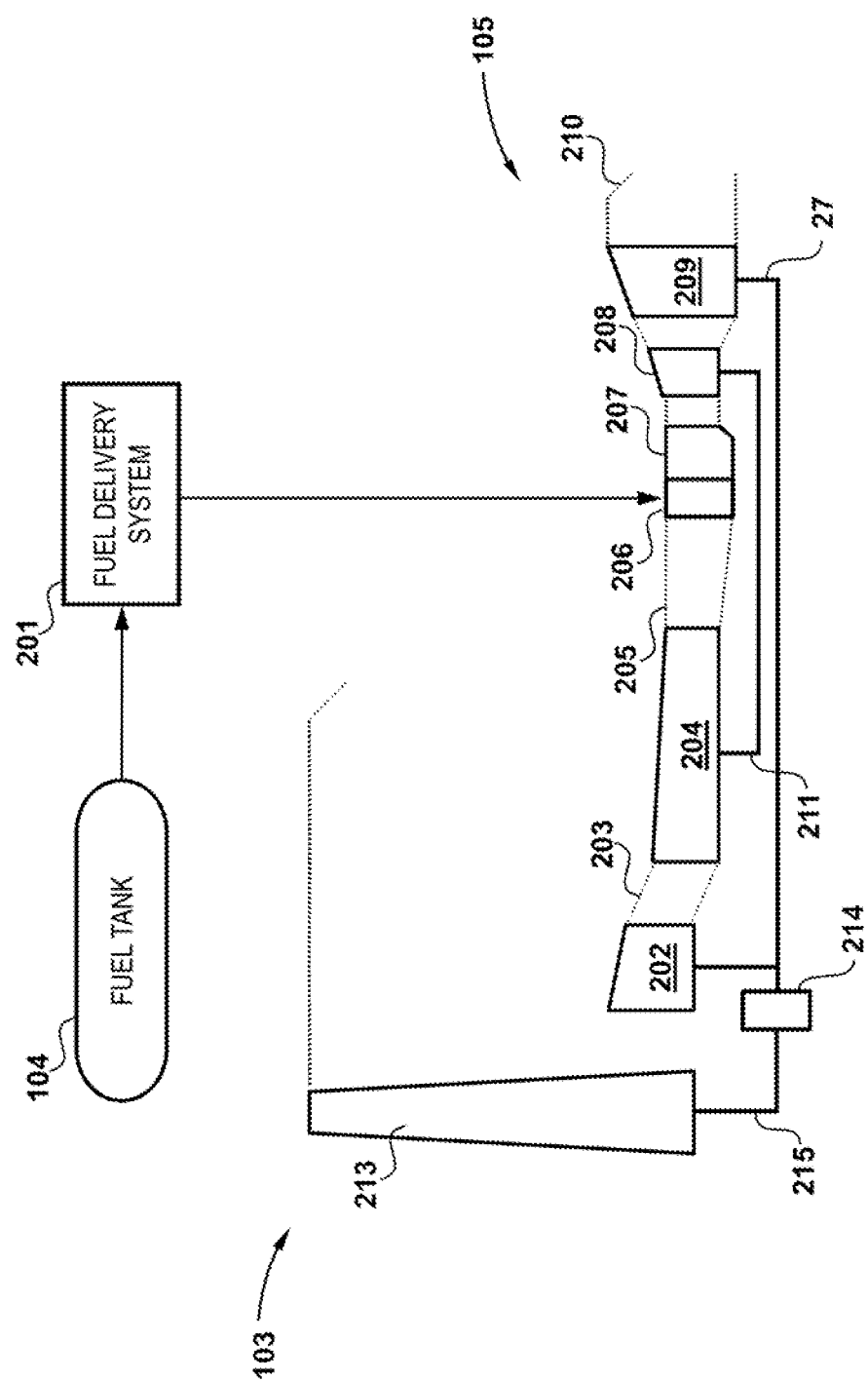
FIG. 2 shows one of the turbofan engines of FIG. 1.

A schematic block diagram illustrating the flow of hydrogen fuel to one of the engines 103 is shown in FIG. 2. Hydrogen fuel is obtained from the fuel tank 104 by a fuel delivery system 201 and is supplied to one of the core gas turbines 105. Only one of the gas turbines is shown for clarity.

The core gas turbine 105 comprises, in axial flow series, a low-pressure compressor 202, an interstage duct 203, a high-pressure compressor 204, a diffuser 205, a fuel injection system 206, a combustor 207, a high-pressure turbine 208, a low-pressure turbine 209, and a core nozzle 210. The fuel injection system 206 may be a lean direct fuel injection system. The high-pressure compressor 204 is driven by the high-pressure turbine 208 via a first shaft 211 and the low-pressure compressor 202 is driven by the low-pressure turbine 209 via a second shaft 212. In alternative examples, the gas turbine 105 may comprise more than two shafts.

In a geared turbofan engine such as in the present example, the low-pressure turbine 209 also drives a fan 213 via a reduction gearbox 214. The reduction gearbox 214 receives an input drive from the second shaft 212 and provides an output drive to the fan 213 via a fan shaft 215. The reduction gearbox 214 may be an epicyclic gearbox, which may be of planetary, star or compound configuration. In further alternatives, the reduction gearbox 214 may be a layshaft-type reduction gearbox or another type of reduction gearbox. It will be appreciated that the principles disclosed herein may be applied to a direct-drive type turbofan engine, i.e. in which there is no reduction gearbox between the low-pressure turbine 209 and the fan 213, and/or to engines with different numbers of spools, for example three spools.

FIG. 3

Figure 3:
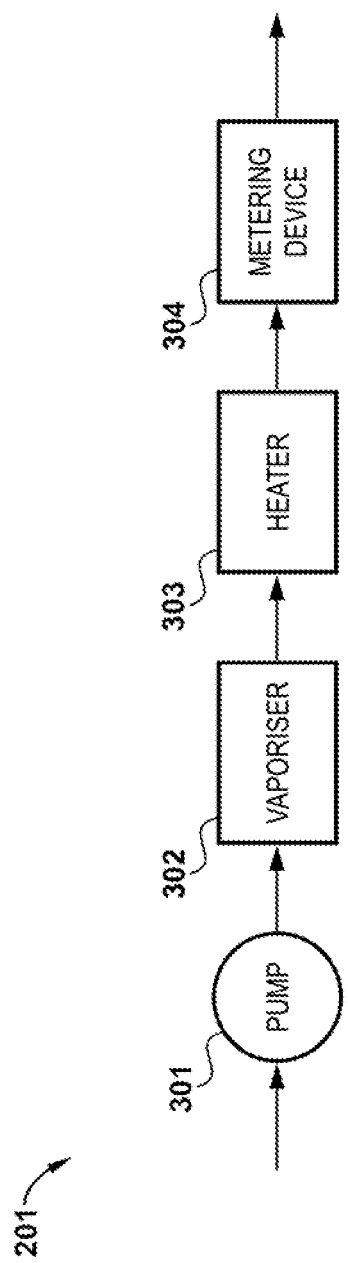
FIG. 3 is a block diagram of the fuel delivery system for the engine of FIG. 2.

In operation, the fuel delivery system 201 is configured to obtain hydrogen fuel from the fuel tank 104 and provide the fuel to the fuel injection system 206. FIG. 3 is a block diagram illustrating the fuel delivery system 201 in greater detail. The fuel delivery system 201 comprises a pump 301, a vaporiser 302, and a heater 303 for heating the hydrogen fuel to an appropriate temperature for metering in a metering device 304 prior to injection by the fuel injection system 206. A vent system may be included in the fuel delivery system 201 close to the fuel injection system 206 to vent hydrogen fuel should a rapid shut-off be required, for example in response to a shaft-break event. It is envisaged that the vent system may vent the excess hydrogen fuel into the bypass duct of the turbofan engine 103, or alternatively vent it outside of the nacelle of the engine 103. Such a system will be described further with reference to FIG. 6. An igniter may be provided to flare off the excess hydrogen in a controlled manner.

The pump 301 may be high-speed centrifugal pump, for example being configured to operate at 40,000 rpm or more. The centrifugal pump may also comprise an axial inducer to minimise the required inlet pressure and to accommodate multiphase flow in addition to a centrifugal impeller for developing the majority of the required pressure rise. In an alternative examples a piston-type pump could be used.

In the present embodiment, the pump 301 is driven electrically. In alternative embodiments, the pump 301 may be driven by a fuel turbine or may be driven by an air turbine supplied with compressor bleed, for example bleed from the high-pressure compressor 204. Alternatively, combustion products from the combustor 207 may be used to drive a dedicated turbine for driving the pump 301.

The metering device 304 is configured to meter the required quantity of fuel for the current fuel demand of the core gas turbine 105.

As will be appreciated, it is desirable to increase the temperature of the fuel from the 20 kelvin cryogenic storage condition to a temperature closer to the firing temperature of the gas turbine, subject to not exceeding the autoignition temperature prior to injection into the combustor 207. The injection temperature may for example be between around 250 kelvin and around 300 kelvin, for example around 280 kelvin.

The fuel from the pump 301 may be heated with a vaporiser 302 and, optionally, as in the present embodiment, by a heater 303 so as to implement a phase change between the pump 301 and the metering device 304. In this way the metering device 304 meters gaseous hydrogen fuel. In some examples the vaporiser 302 may be configured to raise the temperature of the hydrogen fuel to the required injection temperature, thereby negating the need for an additional heater 303.

The fuel heating system, i.e. the vaporiser 302 and heater 303, may comprise one or more heat exchangers for raising the temperature of the hydrogen fuel by use of rejected heat from the gas turbine 105. This may be achieved by implementing a complex cycle configuration, for example fuel recuperation, intercooling, etc. The fuel heating system may also comprise a pre-heater to provide initial heating of the fuel prior to start-up of the gas turbine.

Fuel heating may be achieved by cooling one or more of the various oil systems in the core gas turbine 105. For example, the heater 303 may comprise a fuel-oil heat exchanger for cooling lubricating oil from the reduction gearbox 214. In an example, even with a 99 percent efficient gearset, at maximum thrust it may still be required to reject around 750 kilowatts of heat from the gearbox oil system, which represents a significant opportunity for raising the temperature of the hydrogen fuel. It will be appreciated that other engine oil, such as main bearing lubrication oil, may also be cooled in a similar manner. It will also be appreciated that cooling air systems may be cooled in a similar manner, with high-pressure compressor 204 discharge air being cooled by heat exchange with hydrogen fuel. Such an implementation will be described further with reference to FIG. 5.

Fuel flow on a conventional liquid-fuelled aero engine is typically controlled by means of a pressure regulating valve and a profiled translating spill valve which returns a proportion of the flow supplied by the pump back to the pump inlet. However, because hydrogen has an extremely low density and viscosity, it has a strong tendency to leak through any gap. A control system that relies on close clearances to minimise leakages will be highly problematic with hydrogen as the fuel, since there will be significant leakage with even very tight clearances and the significant thermal variations in a hydrogen system will preclude very tight clearances. Hence the metering device 304 may therefore instead use a fixed orifice, which inherently has no moving parts and may therefore be sealed.

FIG. 4

Figure 4:
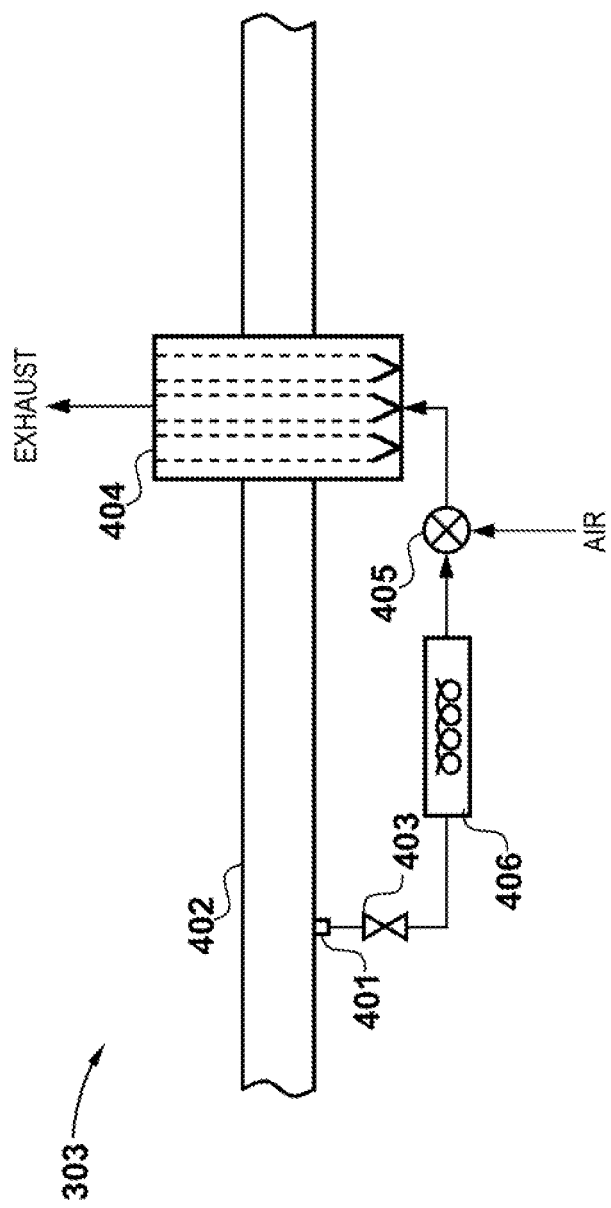
FIG. 4 shows the vaporiser for the fuel delivery system of FIG. 3.

In a simple cycle configuration it has been determined that, due to the significant heat capacity of the hydrogen fuel, even if it is utilised as a heatsink for engine waste heat, it may still not reach the required injection temperature without implementation of the vaporiser 302. Further, even in a complex cycle configuration in which the heat of combustion products is recuperated into the hydrogen fuel, it has been determined that a certain points in the operational envelope there may be insufficient heat output from the engine to raise the fuel temperature to the injection temperature. Such occasions may include, for example, ground start, in-flight relight and end of cruise idle. An example configuration of the vaporiser 302 is shown in FIG. 4.

The vaporiser 302 comprises an offtake 401 from a main fuel conduit 402. The amount of hydrogen bled from the main fuel conduit 402 is controlled by a bleed valve 403. In operation, of the order of around 1 percent of the hydrogen fuel flow through the main fuel conduit 402 is bled for use in the vaporiser 302.

As described previously, hydrogen has very high specific and latent heat capacities; however, as a gas it has a very low molecular weight and density, and thus it can be challenging to exchange heat in a compact way. Thus, the vaporiser 302 vaporises the hydrogen fuel in the main fuel conduit 402 by combustion of the bled fuel in a burner 404 located in heat exchange relationship with the main fuel conduit 402. In the present embodiment, the burner 404 is concentric around the main fuel conduit 402, although it will be appreciated that other arrangements are possible.

In the present embodiment, air for combustion with the bled hydrogen fuel is mixed in a premixer 405, although in alternative embodiments it may be co-injected into the burner with the hydrogen fuel instead. Combustion products from the burner 404 are, in an embodiment, vented into the bypass duct of the turbofan engine 103.

In steady state, there is enough heat emanating from the burner to ensure vaporisation of the small amount of bled hydrogen fuel. At engine start or other cold conditions for example, the vaporiser comprises a preheater 406 to ensure vaporisation of the bled hydrogen fuel prior to mixing with air in the premixer 405. In a specific embodiment, the preheater 406 comprises an electric heating element, for example a coil. Alternatively, the preheater 406 could be simply configured as a boil volume, in which the ambient conditions therein contain sufficient enthalpy to boil the initial flow of bled hydrogen fuel prior to delivery to the premixer 405 and the burner

FIG. 5

Figure 5:
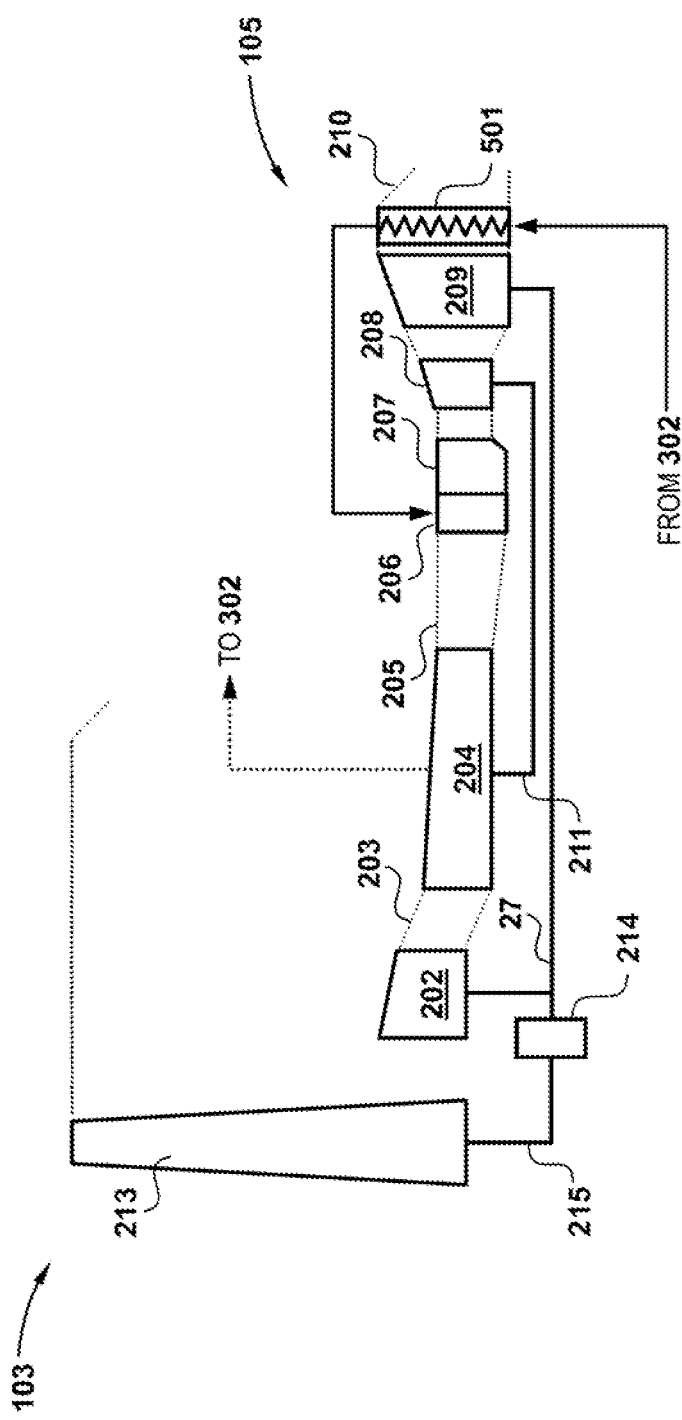
FIG. 5 shows the integration of the fuel delivery system and the engine.

In the present embodiment, the core gas turbine 105 implements a complex cycle by way of recuperation of exhaust heat into the hydrogen fuel. A schematic of the integration of the fuel delivery system 201 into such a configuration is shown in FIG. 5, like reference numerals used for features common to those used in FIG. 2.

In this embodiment, a recuperator 501 is located between the low-pressure turbine 209 and core nozzle 210. The recuperator 501 may for example be of spiral-wound form, which reduces the likelihood of fracture due to thermal expansion and contraction. In the present embodiment, the recuperator 501 forms part of the heater 304 and hence is operable to heat hydrogen fuel received from the vaporiser 302 using heat from the exhaust stream of the core gas turbine 105. In this way, less fuel may be required to heat the hydrogen fuel to the injection temperature, increasing cycle efficiency. Bleed air may be sourced from the high-pressure compressor 204 for supply to the vaporiser 302, although it will be appreciated that other sources of air may be used, for example from the low-pressure compressor 202 or from the bypass duct.

FIG. 6

A problem with the use of hydrogen as a fuel is that the fuel lines in the fuel delivery system 201 must be purged of any residual oxygen prior to introducing hydrogen to avoid creating an explosive mixture in the fuel lines during start-up. In conventional ground-based systems, a series of purging steps may be carried out before the system is fully ready to operate. These purging steps typically involve a purge with helium, which is used because it also has a low boiling point and is inert. Helium is, however, increasingly expensive due to its scarcity and is entirely wasted when used as a purge gas. Use of helium as a purge gas is therefore unsustainable as a purge gas for an aircraft fuel delivery system based on hydrogen.

This problem may be solved by instead using a purge gas to remove residual oxygen from the fuel lines, followed by a second purge with hydrogen fuel gas to remove the purge gas before introducing liquid hydrogen fuel to the system. In the present embodiment, nitrogen is used as it is an inert gas (as will be understood by those skilled in the art, the term "inert gas" as used herein means one which do not undergo reactions such as oxidation in the conditions of the fuel delivery system 201 disclosed herein). Other suitable inert gases such as neon, argon, or krypton could be used, however nitrogen is abundant and inexpensive, and is therefore most practical for aircraft applications.

Figure 6:
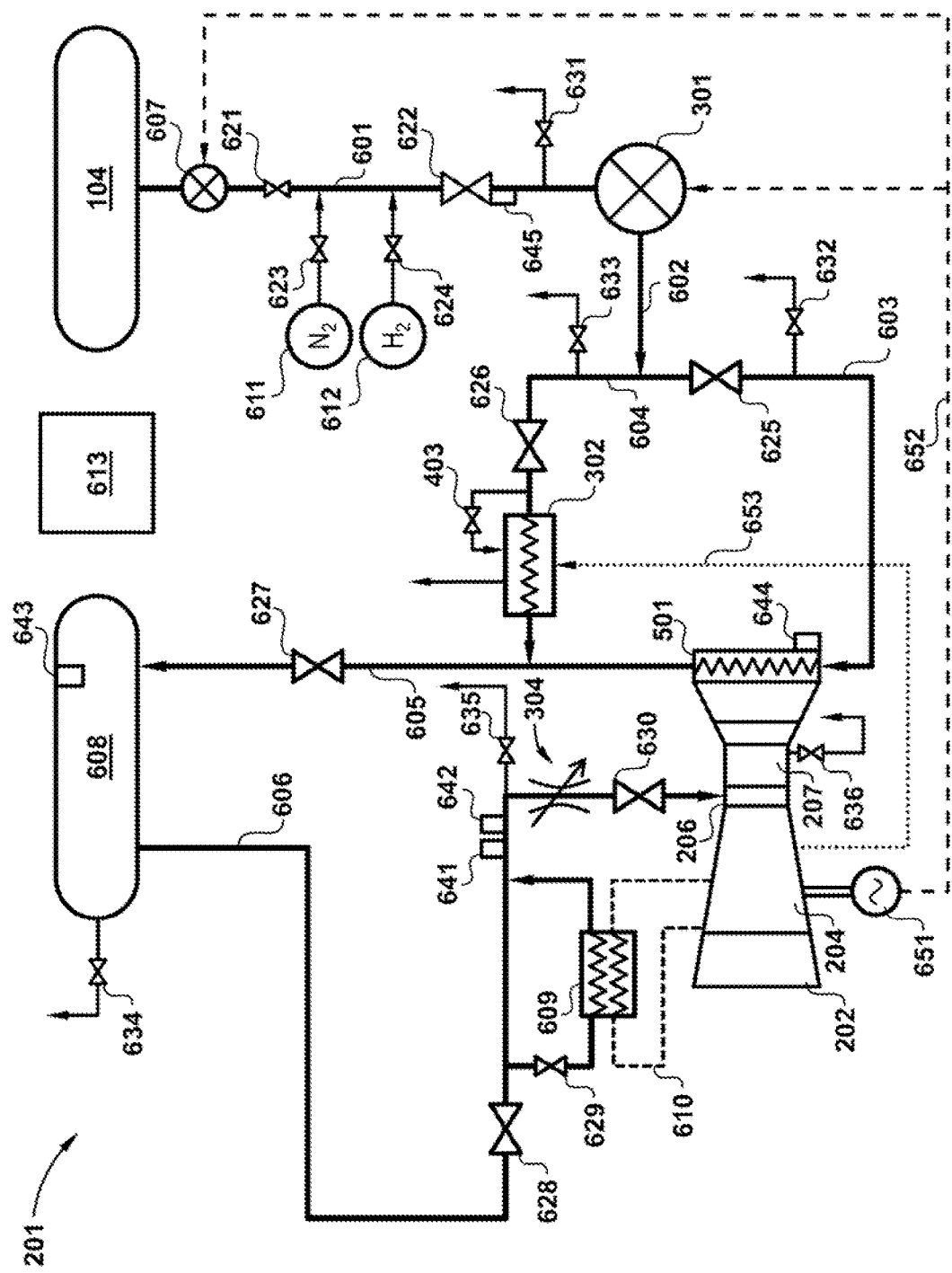
FIG. 6 is a more detailed schematic of the fuel delivery system.
Figure 7:
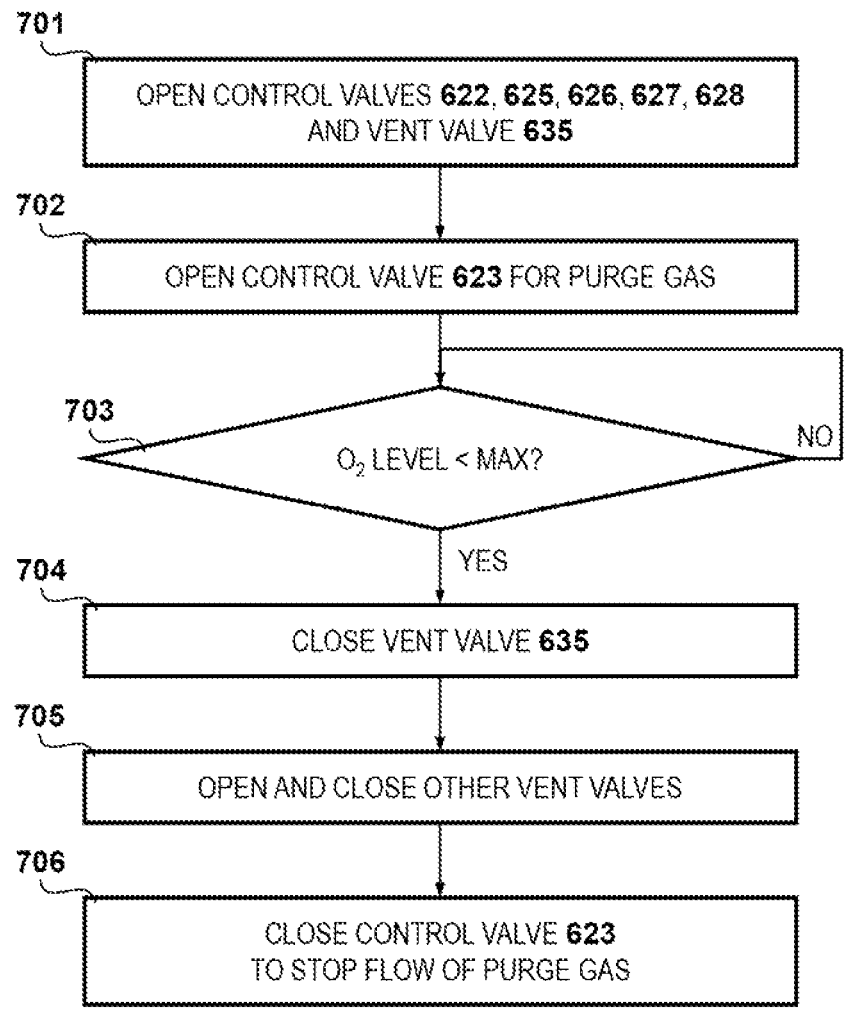
FIG. 7 is a flow diagram of an example first purging procedure for the fuel delivery system of FIG. 6.

A detailed schematic of the fuel delivery system 201 implementing such a purge system is shown in FIG. 6. Hydrogen fuel is provided from the fuel tank 104 to the fuel pump 301 and ultimately to the fuel injection system 206 via a fuel lines 601, 602, 603, 604, 605, and 606.

In the present embodiment, a low-pressure pump 607, which may be provided in the tank 104 itself, lifts liquid fuel from the tank into a first fuel line 601 and to the fuel pump 301. High-pressure fuel is then directed via a second fuel line 602 and then to either or both of the recuperator 501 and the vaporiser 302 via a third fuel line 603 and a fourth fuel line 604 respectively. The outlets of the vaporiser 302 and the recuperator 501 are then merged.

Heated fuel is then directed via a fifth fuel line 605 to a buffer tank 608 configured and arranged to provide a pressurised buffer capacity for fuel in gaseous form following vaporisation and prior to injection by the fuel injection system 206. In some examples a dedicated buffer tank may not be required, and the required buffer of pressurised gas within the fuel supply lines themselves may be sufficient. It will be appreciated that, as used herein, the term "buffer tank" may encompass both options.

Fuel then continues via a sixth fuel line 606 comprising the metering device 304 where metering takes place prior to provision to the fuel injection system 206. In the present example, a fuel-cooled oil cooler 609 (forming part of the heater 303 in addition to the recuperator 501) is provided in parallel to the sixth fuel line 606. The fuel-cooled oil cooler 609 transfers heat from oil flowing in the engine 103, for example through an engine gearbox and/or through various bearings in the engine 103. An oil line 610 provides a flow of oil from the engine 103 through the fuel-cooled oil cooler 609.

A first purge gas tank 611 and a second purge gas tank 612 are provided for storing an inert purge gas and a fuel purge gas respectively.

The gases may be stored under pressure and at or around ambient temperature, for example at around 40 bar and around 288 kelvin. The first purge gas tank 611 may store nitrogen (or another inert or non-fuel gas) for purging fuel lines between the fuel tank 104 and the fuel injection system 206. The second purge gas tank 612 stores hydrogen fuel in gaseous form for priming the fuel lines following purging. The second purge gas tank 612 may be provided with a supply of hydrogen from the cryogenic tank 1204 to replenish the gas tank 612. In the present embodiment, the first purge gas tank 611 is refillable, and is refilled from ground equipment.

However, in an alternative embodiment, the system may comprise an inert gas generator, such as a porous membrane enriched nitrogen generator, or a catalytic air separator. Suitable air separators include the FSDASM001 Air Separation Module, manufactured by Parker Aerospace. Such a generator produces nitrogen enriched air, by separating oxygen and nitrogen from atmospheric air, and using the enriched nitrogen outlet as the purging gas. Such a system must produce an inert purging gas having an oxygen concentration below the limiting oxygen concentration for hydrogen (i.e. approximately 95% nitrogen, 5% oxygen). As such, the system may require several stages or several passes through the air separation module in order to achieve the desired low oxygen concentration level.

The fuel delivery system 201 further comprises a controller 613 to effect control of the pumps 301, 607 in response to fuel flow demand. The controller 613 is also configured to control various valves and respond to various sensor inputs from the components in the fuel delivery system 201.

The first fuel line 601 comprises a first control valve 621 operable to open and close off flow from the low-pressure pump 607. The first fuel line 601 further comprises a second control valve 622 between the first control valve 621 and the fuel pump 301.

The first purge gas tank 611 is connected to the first fuel line 601 via a third control valve 623, and the second purge gas tank 612 is connected to the first fuel line 601 via a fourth control valve 624. The outlet of the third control valve 623 is connected to the first fuel line 601 between the first control valve 621 and the second control valve 622, and the outlet of the fourth control valve 624 is connected to the first fuel line 601 between the connection of the third control valve 623 and the second control valve 622.

Further control valves are situated in the plurality of fuel lines post-fuel pump 301.

A fifth control valve 625 is provided in the third fuel line 603 to connect the fuel pump 301 to an inlet of the recuperator 501 when opened.

A sixth control valve 626 is provided in the fourth fuel line 604 to connect the fuel pump 301 to an inlet of the vaporiser 302 when opened.

A seventh control valve 627 is provided in the fifth fuel line 605 to connect outlets of the vaporiser 301 and recuperator 501 to the buffer tank 608 when opened.

An eighth valve 628 is provided in the sixth fuel line 606 to connect the outlet of the buffer tank 608 to the fuel injection system 206 when opened.

In the present example, a ninth control valve 629 is connected between the sixth fuel line 606 and the fuel-cooled oil cooler 609 to bleed fuel from the sixth fuel line 606 to cool oil flowing through the oil line 610 when opened.

A tenth control valve 630 is connected between the metering device 304 and the fuel injection system 206 to allow fuel to proceed to the fuel injection system 206 and the combustor 207 for combustion when the valve is opened. The valve 630 may operate as a fuel shut-off valve, configured to rapidly close in the event of a shaft-break, for example In addition to the various control valves, a number of vent valves are also provided to provide for venting outside of the fuel delivery system 201. In the present example, the vent valves may vent to atmosphere, which will be understood to include lower pressure zones in the engine, such as the bypass duct, as well as free air outside of the engine.

A first vent valve 631 is provided between the second control valve 622 and the fuel pump 301.

A second vent valve 632 is provided between the outlet of the fifth control valve 625 and the inlet of the recuperator 501.

A third vent valve 633 is provided between the outlet of the fuel pump 301 and the inlet for the sixth control valve 626.

A fourth vent valve 634 connects the buffer tank 608 to atmosphere when opened to allow for control of gas pressure within the buffer tank 608.

A fifth vent valve 635 is provided on the sixth fuel line 606 to vent the sixth fuel line 606 to atmosphere when opened.

A sixth vent valve 636 is provided to connect the combustor 207 to atmosphere when opened, and hence operates as a combustor blow-off valve operable to rapidly discharge the high-pressure combustion products out of the core gas turbine 105. In the present embodiment, a number of sensors are also provided for providing data to the controller 614.

An oxygen sensor 641 may be provided in the sixth fuel line 606 proximate the fifth vent valve 635 to determine a level of oxygen in the sixth fuel line 606. In addition, a fuel gas sensor, in this example a hydrogen sensor 642, may be provided therewith for determining the level of hydrogen in the sixth fuel line 606.

The buffer tank 608 may comprise an internal pressure sensor 643 to determine the pressure in the buffer tank 608.

A temperature sensor 644 may be provided to sense a temperature in the fuel pass of the recuperator 501.

A pressure sensor 645 may be provided at the outlet of the second control valve 622 to determine the pressure in the first fuel line 601.

In the present embodiment, the engine 103 comprises an electric starter-generator 651 which is connected to one of the spools, in this example the high-pressure spool. When the engine 103 is running, the starter-generator 651 functions as an alternator and provides electrical power via an electrical connection 652 to the fuel pumps 301 and 607. When the engine 103 is not operational, power may be supplied from a battery or external electrical supply as common in the art. In this way, the starter-generator 641 may crank the high-pressure spool using such battery or external electrical power and hence enable engine start.

Finally, a bleed air line 653 is provided from, in this example, the high-pressure compressor 204 to the vaporiser 302, to provide a required pressurised air supply to the pre-mixer 405 (FIG. 4).

FIG. 7

Prior to start-up of the engine 103, the fuel lines 601-606 from the fuel tank 104 to the fuel injection system 206 require purging, for example after the engine 103 has been inactive for an extended period or after maintenance. At the start of a purge procedure, control valve 621 and vent valves 631, 632, 633, and 634 are closed to prevent fuel flowing from the fuel tank 104 and to isolate the fuel lines from the atmosphere. A purging procedure is illustrated as a series of steps in the flow diagram in FIG. 13.

In a first purging step 701, control valves 622, 625, 626, 627, and 628 and the fifth vent valve 635 are opened to provide a gas path through the fuel lines and to atmosphere via the fifth vent valve 635.

In a second step 702, third control valve 623 is opened, allowing purge gas from the first purge gas tank 611 to enter the first fuel line 601. The purge gas passes through the fuel lines 601-606 and exits through vent valve 635.

Purging with the purge gas may continue (step 703) until a level of oxygen sensed by the oxygen sensor 641 is below a predetermined maximum level, i.e. a pre-set partial pressure.

Once the pre-set level of oxygen is reached, vent valve 635 is closed (step 704) and the other vent valves 631, 632, 633, and 634 may be briefly opened (step 705), for example for less than one second, and then closed again to allow any residual gas not purged by the purge gas to be vented. The third control valve 623 may then be closed (step 706) to close off flow of purge gas.

Following the above first purging procedure, any fuel in the fuel lines 601-606, the buffer tank 608 and the vent valves 631, 632, 633, and 634 is purged from the system, leaving the system 201 in a safe condition.

FIG. 8

Figure 8:
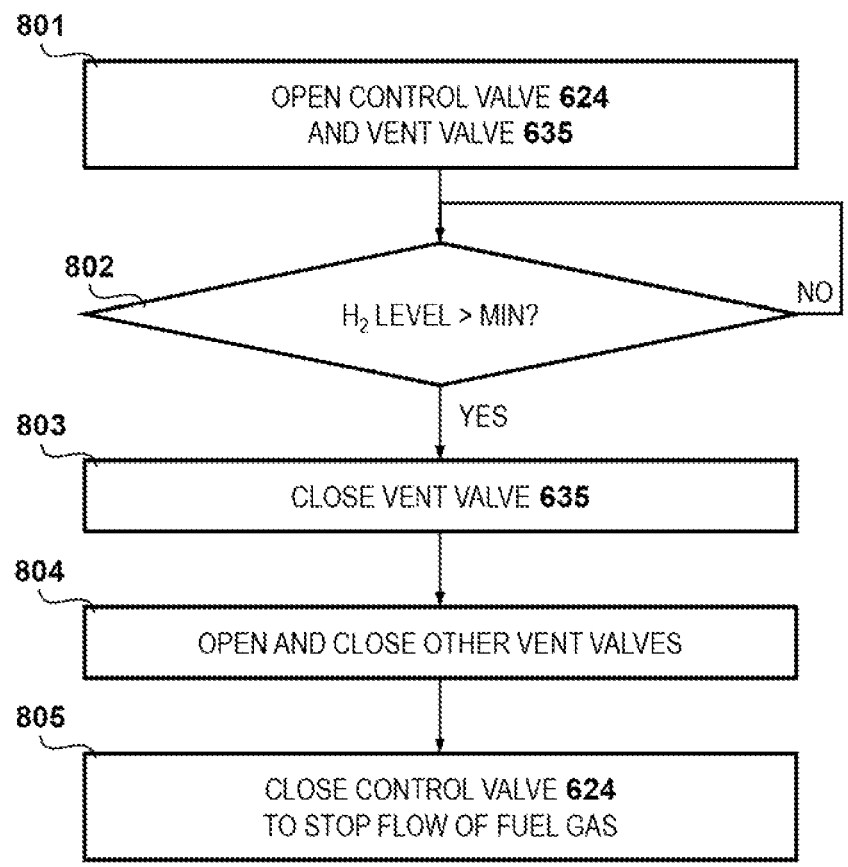
FIG. 8 is a flow diagram of an example second purging procedure for the fuel delivery system of FIG. 6.

A second purging procedure, which may follow immediately from the first purging procedure, is illustrated in the flow diagram of FIG. 8.

With the third control valve 623 closed, the fourth control valve 624 and the fifth vent valve 635 are opened (step 801), allowing fuel gas (i.e. hydrogen) to enter the first fuel line 601 from the second purge gas tank 612. The fuel lines 601-606 are then flushed with fuel gas by opening the fourth control valve 624, thereby purging any purge gas. The fuel gas ultimately exits through vent valve 635.

Once a sufficient level of fuel gas is detected in the sixth fuel line 606 (step 802), for example using the hydrogen sensor 642, as with the first purging step, the fifth vent valve 635 is closed (step 803) and vent valves 631, 632, 633, and 634 may be briefly opened and then closed again (step 804) to allow any residual gas not purged by the fuel gas to be vented.

The fourth control valve 624 is then closed (step 805). The tenth control valve 630 remains closed until the engine 103 is ready for starting.

FIG. 9

Figure 9:
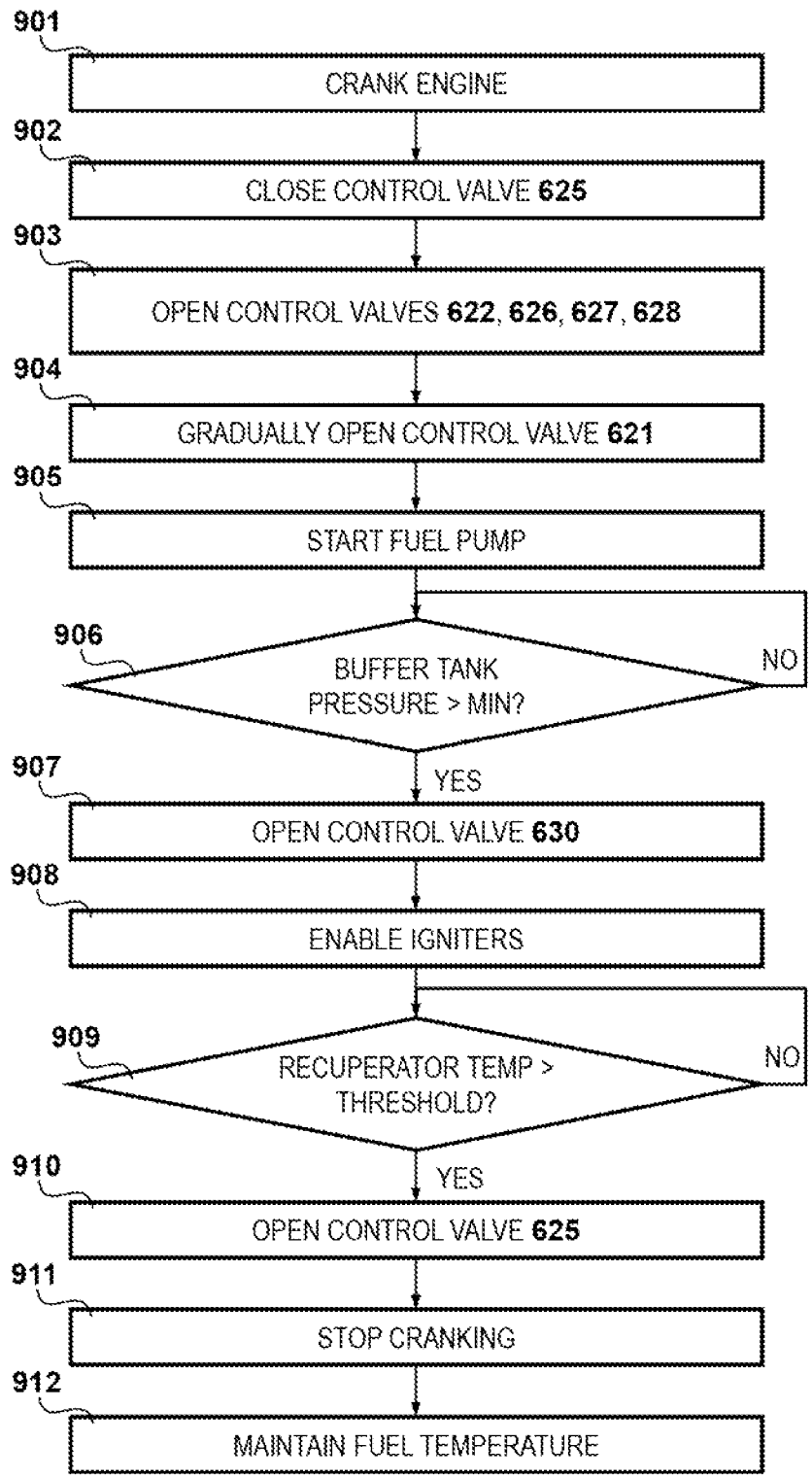
FIG. 9 is a flow diagram of an example engine starting procedure for the fuel delivery system of FIG. 6.

FIG. 9 illustrates an example engine starting procedure. To begin operation of the engine 103, with or without an initial purging procedure depending on the previous state of the fuel delivery system 201, the engine 103 is cranked (step 901) using the electric starter-generator 651 without fuel being present in the combustor 207.

In the present example, as the engine is cranked, the high-pressure compressor 204 begins to move air through the engine gas path. Consequently, the vaporiser 302 then receives airflow via the bleed line 653, allowing the vaporiser 302 to begin heating once fuel gas begins flowing. Vent valves 631, 632, 633, 634, and 635 should already be closed after a preceding purge or shutdown procedure, preventing fuel gas from exiting the fuel lines. In the present implementation, control valve 625 in the recuperator fuel line 603 is closed (step 902) to prevent fuel gas from passing through the recuperator 501 during start-up as it will not yet have any engine exhaust flowing therethrough.

Control valves 622, 626, 627, 628 in (respectively) the liquid fuel lines 601, 602, vaporiser fuel line 604, buffer tank fuel line 605 and combustor fuel line 606 are then opened (step 903). This forms a path for fuel to pass from the fuel tank 104 through the fuel pump 301, vaporiser 302 and buffer tank 608 to the fuel injection system 206.

The first control valve 621 is then opened gradually (step 904) to minimise any thermal shock, allowing liquid fuel to flow through the first fuel line 601 to the fuel pump 301.

The fuel pump 301 is then started (step 905) and liquid fuel begins to be pumped through the second and fourth fuel lines 602, 604 to the vaporiser 302.

As the vaporiser 302 vaporises liquid fuel from the fuel pump 301, the buffer tank 608 begins to pressurise with gaseous fuel. Once a pressure in the buffer tank 608 reaches a pre-set level, as for example determined by the internal pressure sensor 643 (step 906), the tenth control valve 630 is opened (step 907) and fuel flows to the fuel injection system 206 and into the combustor 207 where it may be ignited (step 908).

The combination of the starter-generator 651 cranking the engine 103, thus driving air therethrough, and a gradual opening of the tenth control valve 630 ensures that fuel gas does not pool into explosive mixtures without being evacuated, or burned following light-off.

As the engine 103 begins to accelerate by the fuel gas being burned in the combustor 207 and driving the turbines, pressure in the buffer tank 608 is maintained by operation of the fuel pump 301 and the vaporiser 302, with the vaporiser bleed valve 403 being adjusted accordingly.

As the engine 103 warms up, the recuperator 501 will also be warmed. A temperature of the recuperator 501 may be monitored with the temperature sensor 644 (step 909) to determine when the recuperator 501 has reached a threshold temperature.

The recuperator temperature will eventually reach a temperature that allows fuel flow to pass through the recuperator 501 via the third fuel line 603 by opening control valve 625 (step 910).

Once the engine is under power from fuel being supplied, the starter-generator 651 can stop cranking the engine (step 911) and revert to operating as a generator.

The vaporiser 302 may then be continuously adjusted while the engine is under power to maintain a required temperature of fuel gas in fuel lines 605, 606 (step 912).

FIG. 10

Figure 10:
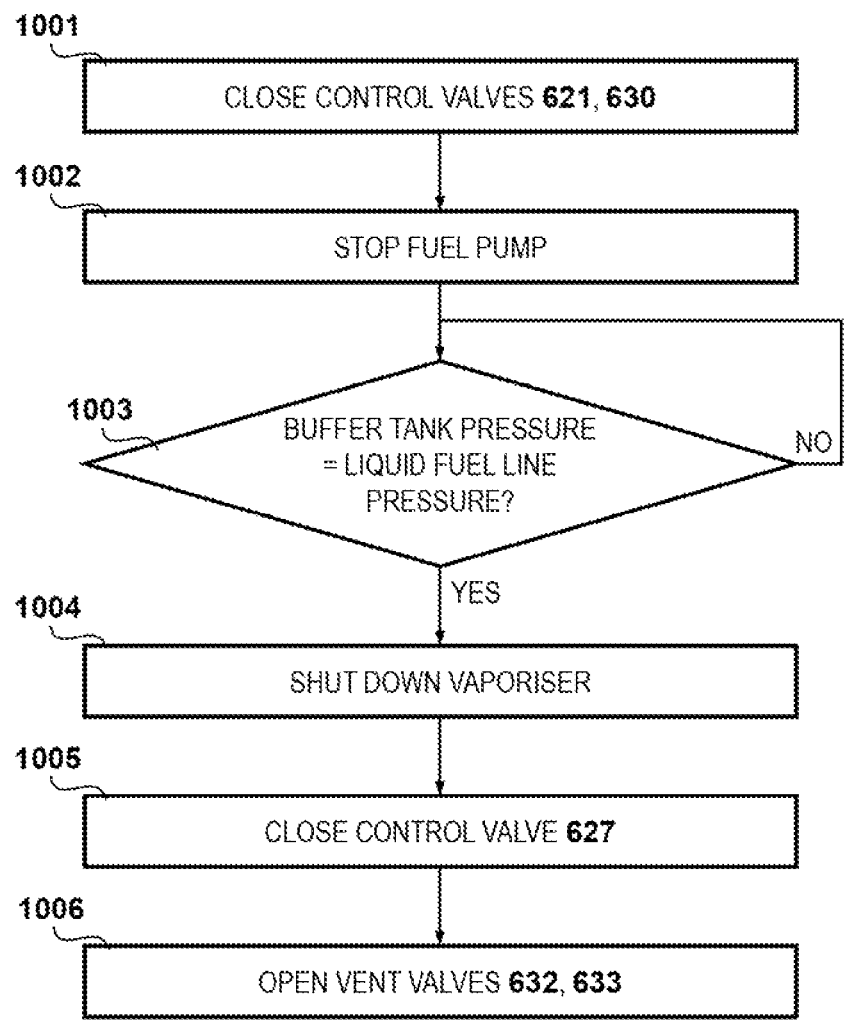
FIG. 10 is a flow diagram of an example engine shutdown procedure for the fuel delivery system of FIG. 6.

FIG. 10 illustrates an example engine shutdown procedure. From a state where the engine 103 is running under fuel power alone, for example after the above described start-up procedure, shutdown of the engine 103 begins by first cutting off the flow of fuel to the engine 103 by closing the first control valve 621 to stop the flow of liquid fuel from the fuel tank 104, and closing of the tenth control valve 630, causing combustion in the combustor 207 to cease (step 1001).

The fuel pump 301 is then stopped (step 1002).

The fourth vent valve 634 is modulated to maintain a required pressure of fuel in the buffer tank 608, and when a pressure in the first fuel line 601 at the second control valve 622 as measured by the pressure sensor 645 reaches a pressure of the buffer tank 608 (step 1003), the vaporiser 302 can be shut down (step 1004) as any remaining liquid fuel boils off in the first, second, third and fourth fuel lines 601, 602, 603, 604.

To prevent backflow from the buffer tank 608, the seventh control valve 627 may be closed (step 1005) and vent valves 632, 633 may then be opened (step 1006), allowing residual fuel gas to escape to atmosphere.

In this state, with fuel gas in the buffer tank 608 remaining under pressure, the engine 103 may then be quickly restarted without first performing a purge procedure. This state may therefore be suitable for a turnaround procedure, in which the engine 103 is expected to be restarted after a short stop. To restart the engine 103, the procedure described above with reference to FIG. 9 may be carried out, once the purge valves 632, 633 are closed.

Further, in some circumstances, for example inclement weather or flying through volcanic ash, it is possible for aero gas turbine engines to flame out. If such a condition is detected, then in the present embodiment the sixth vent valve 636 is opened to rapidly exhaust unburnt fuel and combustion products in the combustor 207 to atmosphere. At the same time, the tenth control valve 630 is closed to shut off fuel flow to the fuel injection system 206.

The pump 301 then decelerates and hence fuel flow is reduced to an idle flow condition, with the fuel venting at the idle flow rate from the fifth vent valve 635.

To commence the relight procedure, the igniters (not shown) of the known type in the combustor 207 are activated and, simultaneously, the fifth vent valve 635 is gradually shut and the tenth control valve 630 is gradually opened.

As fuel flows back through the fuel injection system 206 and into the combustor 207, it ignites rapidly, and once the tenth control valve 630 has fully opened, the fifth vent valve 635 has fully closed, and the combustor 207 has reached stable operation, the engine 103 may be accelerated in the normal way.

FIG. 11

Figure 11:
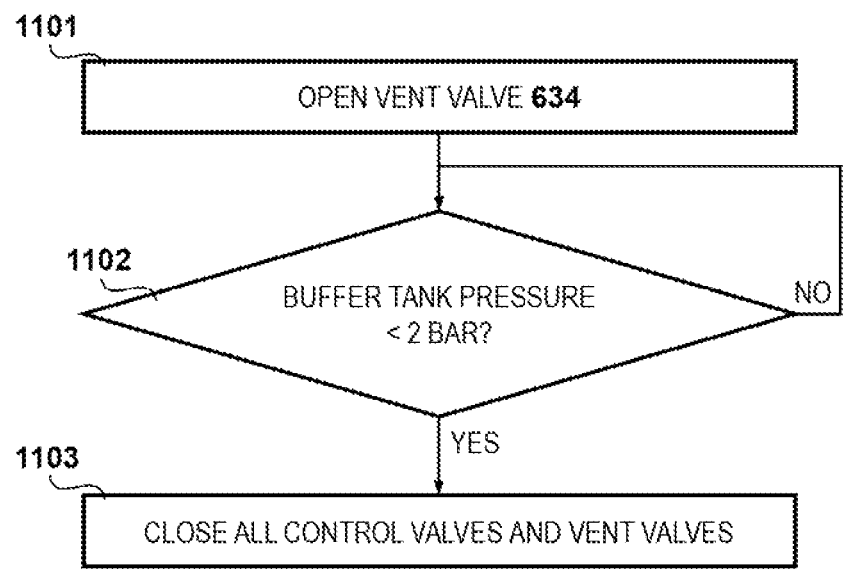
FIG. 11 is a flow diagram of an example full engine shutdown procedure for the fuel delivery system of FIG. 6.

FIG. 11 illustrates an example procedure for performing a full shutdown, for example for a longer shutdown period. After performing the shutdown procedure of FIG. 10, fuel gas from the second purge gas tank 612 may be used to purge remaining liquid fuel from fuel lines 601, 602, venting gas to atmosphere via one or more of the vent valves 631, 632, and 633. The fourth vent valve 634 is opened (step 1101) to allow pressure in the buffer tank 608 to be reduced, for example to around 2 bar (step 1102), following which all valves may be closed (step 1103) and the fuel delivery system 201 is fully shut down.

FIG. 12

Figure 12:
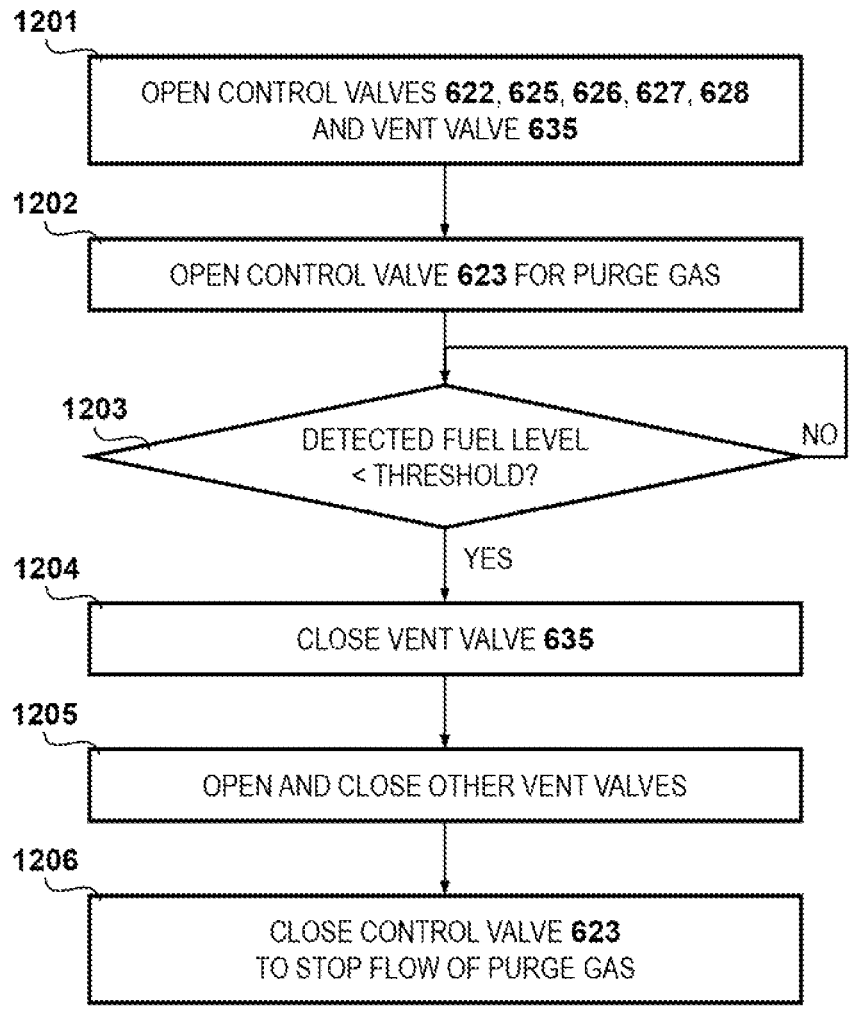
FIG. 12 is a flow diagram of an example engine maintenance shutdown procedure for the fuel delivery system of FIG. 6.

To allow for maintenance following shutdown, the procedure illustrated in FIG. 12 may be followed. The fuel lines 601-606 may be purged with inert gas from the first purge gas tank 611 by first (step 1201) opening the fifth vent valve 635 and control valves 622, 625, 626, 627, 628, and 629, while leaving the first control valve 621 and vent valves 631, 632, 633, and 634 closed.

The third control valve 623 may then be opened (step 1202) to allow purge gas to flow through the fuel lines and vent through the fifth vent valve 635.

Once a sufficiently low level of fuel is detected, for example with hydrogen sensor 642 (step 1203), the fifth vent valve 635 may be closed (step 1204) and the other vent valves 631, 632, 633, and 634 briefly opened and closed (step 1205) to allow any remaining fuel gas to be vented to atmosphere.

The third control valve 623 is then closed to stop the flow of purge gas (step 1206). The fuel delivery system 201 will then be inert, i.e. having no fuel gas in the system other than fuel stored cryogenically in the fuel tank 104 and hence may be worked on safely.

In each of the above example procedures, the controller 613 is configured to carry out the procedure by operating the various valves and other components of the fuel delivery system 201.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A fuel delivery system for a gas turbine engine, the fuel delivery system comprising:
    a first fuel line for connection to a cryogenic fuel tank;
    a fuel pump connected to receive fuel via the first fuel line;
    a plurality of fuel lines connecting the fuel pump to a combustor of the gas turbine engine;
    a controller configured to operate the fuel delivery system;
    a purge gas tank connected to the first fuel line and configured to store a purge gas for purging the plurality of fuel lines; and
    a fuel gas tank connected to the first fuel line and configured to store a fuel gas for flushing purge gas from the plurality of fuel lines;
    a purge gas valve between the purge gas tank and the first fuel line; and
    a fuel gas valve between the fuel gas tank and the first fuel line;
    an oxygen sensor at an end of the plurality of fuel lines proximate the combustor;
    wherein the controller is configured to open the purge gas valve to purge gas from the plurality of fuel lines in a first gas purging procedure, and following the first purging procedure, open the fuel gas valve to flush purge gas from the plurality of fuel lines with fuel gas in a second gas purging procedure;
    wherein the controller is configured to operate the fuel delivery system to perform the first gas purging procedure by:
        opening valves in the plurality of fuel lines;
        opening a vent valve at the end of the plurality of fuel lines;
        opening the purge gas valve connecting the purge gas tank to the first fuel line to allow purge gas from the purge gas tank to enter the first fuel line;
        determining a level of oxygen at the end of the plurality of fuel lines from the oxygen sensor; and
        once the level of oxygen falls below a predetermined level, closing the vent valve and the valve connecting the purge gas tank to the first fuel line.

2. The fuel delivery system of claim 1, in which the fuel gas is hydrogen and the purge gas is an inert gas.

3. The fuel delivery system of claim 1, wherein the controller is further configured to open and then close a plurality of vent valves connected along the plurality of fuel lines after closing the first purge gas tank valve.

4. The fuel delivery system of claim 1, further comprising:
    a fuel gas sensor at the end of the plurality of fuel lines proximate the combustor, wherein the controller is configured to operate the fuel delivery system to perform the second gas purging procedure by:
opening valves in the plurality of fuel lines;
opening a vent valve at an end of the plurality of fuel lines proximate the combustor;
opening the fuel gas valve connecting the fuel gas tank to the first fuel line to allow fuel gas from the fuel gas tank to enter the first fuel line;
determining a level of fuel gas at the end of the plurality of fuel lines from the fuel gas sensor; and
once the level of fuel gas rises above a predetermined level, closing the vent valve and the valve connecting the fuel gas tank to the first fuel line.

5. The fuel delivery system of claim 4, wherein the controller is further configured to open and then close a plurality of vent valves connected to the plurality of fuel lines after closing the valve connecting the fuel gas tank to the first fuel line.

6. The fuel delivery system of claim 1, wherein the plurality of fuel lines comprises second, third, fourth, fifth and sixth fuel lines, the system comprising:
a recuperator connected to a turbine of the gas turbine engine and connected to receive fuel from the fuel pump via series connected second and third fuel lines;
a vaporiser connected to receive fuel from the liquid fuel pump via series connected second and fourth fuel lines;
a buffer tank having an inlet connected to receive fuel from the recuperator and vaporiser via the fifth fuel line; and
the sixth fuel line connecting an outlet of the buffer tank to the combustor of the gas turbine engine.

7. The fuel delivery system of claim 6, further comprising a pressure sensor configured to measure a pressure in the buffer tank, wherein the controller is further configured to operate the fuel delivery system to perform an engine start-up procedure by:
cranking the engine;
closing a valve in the third fuel line leading to the recuperator;
opening a valve in the fourth fuel line leading to the vaporiser;
opening valves in the first, fifth and sixth fuel lines;
opening a valve in the first fuel line to allow liquid fuel from the cryogenic fuel tank to flow through the first fuel line to the liquid fuel pump;
operating the liquid fuel pump;
monitoring a pressure in the buffer tank sensed by the pressure sensor;
once the pressure in the buffer tank reaches a threshold value, opening a control valve connecting the sixth fuel line to provide fuel to the combustor; and
igniting the fuel in the combustor.

8. The fuel delivery system of claim 7, wherein the controller is further configured to operate the fuel delivery system by:
ceasing cranking of the engine;
monitoring a temperature of the recuperator; and
opening the valve in the third fuel line leading to the recuperator once the monitored temperature reaches a threshold value.

9. The fuel delivery system of claim 6, further comprising:
a first pressure sensor configured to measure a pressure in the buffer tank; and
a second pressure sensor configured to measure a pressure in the first fuel line, wherein the controller is further configured to operate the fuel delivery system to perform an engine shutdown procedure by:
closing a liquid fuel valve between the cryogenic fuel tank and the liquid fuel pump;
closing a control valve between the sixth fuel line and the combustor;
shutting down the liquid fuel pump;
modulating a vent valve connected to the buffer tank to maintain a pressure in the buffer tank; and
when a pressure in the first fuel line measured by the second pressure sensor reaches a pressure in the buffer tank measured by the first pressure sensor, turning off the vaporiser.

10. The fuel delivery system of claim 9, wherein the controller is further configured to close a valve in the fifth fuel line and open vent valves in third and fourth fuel lines.

11. The fuel delivery system of claim 9, wherein the controller is further configured to open the pressure relief valve connected to the buffer tank until a pressure measured in the buffer tank reaches a threshold.

12. A method of operating a gas turbine engine fuel delivery system, comprising:
purging gas from a plurality of fuel lines connecting a fuel pump to a combustor of the gas turbine engine with a purge gas in a first gas purging procedure, wherein the first gas purging procedure comprises
opening valves in the plurality of fuel lines;
opening a vent valve at the end of the plurality of fuel lines;
opening a valve connecting the purge gas tank to the first fuel line to allow purge gas from the purge gas tank to enter the first fuel line;
determining a level of oxygen at the end of the plurality of fuel lines; and
once the level of oxygen falls below a predetermined level, closing the vent valve and the valve connecting the purge gas tank to the first fuel line; and
following the first gas purging procedure, flushing purge gas from the plurality of fuel lines with a fuel gas in a second gas purging procedure.

13. The method of claim 12, in which the fuel gas is hydrogen and the purge gas is an inert gas.

14. The method of claim 12, wherein the second gas purging procedure comprises:
opening valves in the plurality of fuel lines;
opening a vent valve at an end of the plurality of fuel lines proximate the combustor;
opening a valve connecting the fuel gas tank to the first fuel line to allow fuel gas from the fuel gas tank to enter the first fuel line;
determining a level of fuel gas at the end of the plurality of fuel lines from the fuel gas sensor; and
once the level of fuel gas rises above a predetermined level, closing the vent valve and the valve connecting the fuel gas tank to the first fuel line.

15. A fuel delivery system for a gas turbine engine, the fuel delivery system comprising:
a first fuel line for connection to a cryogenic fuel tank;
a fuel pump connected to receive fuel via the first fuel line;
a plurality of fuel lines connecting the fuel pump to a combustor of the gas turbine engine;
a controller configured to operate the fuel delivery system;
a purge gas tank connected to the first fuel line and configured to store a purge gas for purging the plurality of fuel lines; and a fuel gas tank connected to the first fuel line and configured to store a fuel gas for flushing purge gas from the plurality of fuel lines;

a purge gas valve between the purge gas tank and the first fuel line; and a fuel gas valve between the fuel gas tank and the first fuel line;

a fuel gas sensor at the end of the plurality of fuel lines proximate the combustor;

wherein the controller is configured to open the purge gas valve to purge gas from the plurality of fuel lines in a first gas purging procedure, and following the first purging procedure, open the fuel gas valve to flush purge gas from the plurality of fuel lines with fuel gas in a second gas purging procedure;

wherein the controller is configured to operate the fuel delivery system to perform the second gas purging procedure by:

opening valves in the plurality of fuel lines;

opening a vent valve at an end of the plurality of fuel lines proximate the combustor;

opening the fuel gas valve connecting the fuel gas tank to the first fuel line to allow fuel gas from the fuel gas tank to enter the first fuel line;

determining a level of fuel gas at the end of the plurality of fuel lines from the fuel gas sensor; and once the level of fuel gas rises above a predetermined level, closing the vent valve and the valve connecting the fuel gas tank to the first fuel line.

16. The fuel delivery system of claim 15, wherein the plurality of fuel lines comprises second, third, fourth, fifth and sixth fuel lines, the system comprising:

a recuperator connected to a turbine of the gas turbine engine and connected to receive fuel from the fuel pump via series connected second and third fuel lines;

a vaporiser connected to receive fuel from the liquid fuel pump via series connected second and fourth fuel lines;

a buffer tank having an inlet connected to receive fuel from the recuperator and vaporiser via the fifth fuel line; and the sixth fuel line connecting an outlet of the buffer tank to the combustor of the gas turbine engine.

17. The fuel delivery system of claim 16, further comprising a pressure sensor configured to measure a pressure in the buffer tank, wherein the controller is further configured to operate the fuel delivery system to perform an engine start-up procedure by:

cranking the engine;

closing a valve in the third fuel line leading to the recuperator;

opening a valve in the fourth fuel line leading to the vaporiser;

opening valves in the first, fifth and sixth fuel lines;

opening a valve in the first fuel line to allow liquid fuel from the cryogenic fuel tank to flow through the first fuel line to the liquid fuel pump;

operating the liquid fuel pump;

monitoring a pressure in the buffer tank sensed by the pressure sensor;

once the pressure in the buffer tank reaches a threshold value, opening a control valve connecting the sixth fuel line to provide fuel to the combustor; and igniting the fuel in the combustor.

18. The fuel delivery system of claim 17, wherein the controller is further configured to operate the fuel delivery system by:

ceasing cranking of the engine;

monitoring a temperature of the recuperator; and opening the valve in the third fuel line leading to the recuperator once the monitored temperature reaches a threshold value.

19. The fuel delivery system of claim 16, further comprising:

a first pressure sensor configured to measure a pressure in the buffer tank; and a second pressure sensor configured to measure a pressure in the first fuel line, wherein the controller is further configured to operate the fuel delivery system to perform an engine shutdown procedure by:

closing a liquid fuel valve between the cryogenic fuel tank and the liquid fuel pump;

closing a control valve between the sixth fuel line and the combustor;

shutting down the liquid fuel pump;

modulating a vent valve connected to the buffer tank to maintain a pressure in the buffer tank; and when a pressure in the first fuel line measured by the second pressure sensor reaches a pressure in the buffer tank measured by the first pressure sensor, turning off the vaporiser.

20. The fuel delivery system of claim 19, wherein the controller is further configured to open the pressure relief valve connected to the buffer tank until a pressure measured in the buffer tank reaches a threshold.

* * * * *